Sept. 8, 1931.  H. R. KENNEDY  1,822,407
WIRE SPOKE STRAIGHTENER AND WHEEL ALIGNING TOOL
Filed Nov. 5, 1930
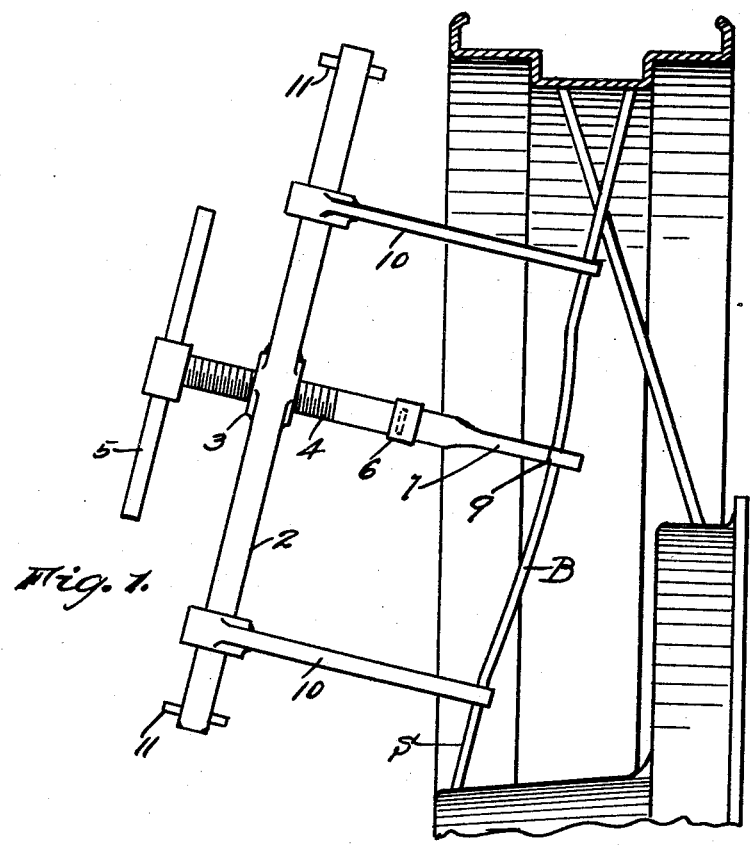
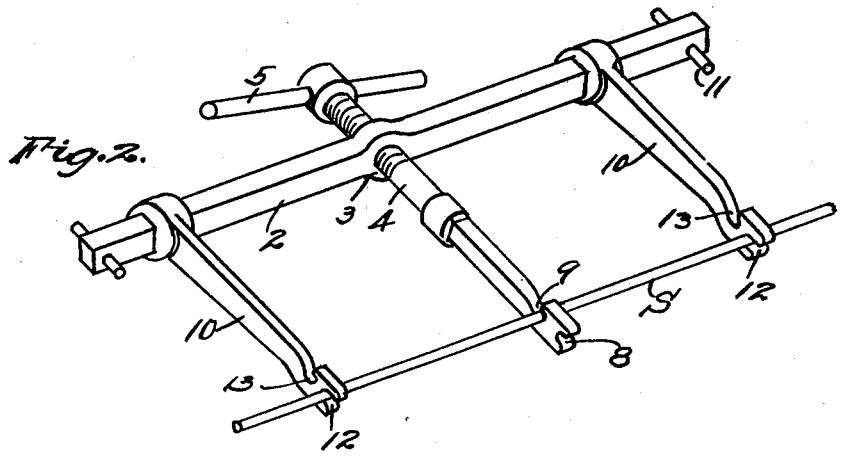
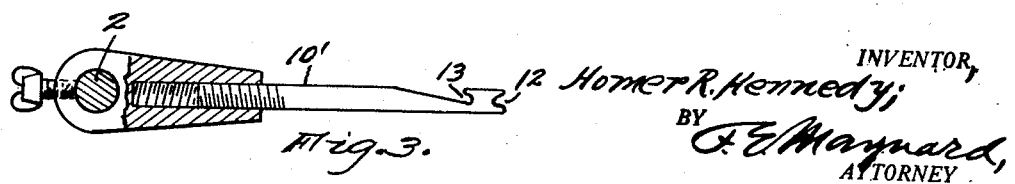
INVENTOR,
Homer R. Kennedy;
BY F. E. Maynard,
ATTORNEY Patented Sept. 8, 1931

1,822,407

UNITED STATES PATENT OFFICE

HOMER R. KENNEDY, OF LOS ANGELES, CALIFORNIA

WIRE SPOKE STRAIGHTENER AND WHEEL ALIGNING TOOL

Application filed November 5, 1930. Serial No. 493,582.

This invention relates to wheelwrights' tools and more particularly to a tool for use on wire spoke wheels.

Wheels of this class are used on various air and land vehicles, and spokes frequently are bent and this tends to disalign the wheel rims.

It is an object of this invention to provide a cheap, simple, practicable and durable hand tool for ready adjustment to and operation upon spokes to straighten them as needed, and, conversely, to enable bending of the spokes when needed to true up wheel rim alignment.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a plan showing the tool as applied for pulling a spoke straight,

Figure 2 is a perspective of the tool, illustrating the contra-jawed hooks, and

Figure 3 is a detail showing an adjustable buttress arm.

In its illustrated form, the apparatus includes a main stock bar 2 having a central boss 3 for a perpendicular jack-screw 4, the outer end of which has a cross-handle 5 and the inner end being joined by a swivel joint 6 to a grapple shank or hooker 7. This hooker has a spoke receiving crotch 8 across its distal end and inwardly disposed on the shank is a hook seat 9.

The stock 2 may be of non-circular section as shown, and on it is slidably mounted a pair of like buttress arms 10 whose lateral outward adjustment is stopped by end pins 11 in the stock 2. These arms have crotched outer ends 12 to receive the spokes and also have lateral hook seats 13.

In use, the arms 10 are spaced from the jack-screw according to the nature of the kink or bend B in a spoke S of a wheel, and the central hooker 7 is adjusted so as to grab the wire by the inner hook seat 9; the crotches 12 buttressing the wire. Then by turning the screw 4, the hooker 7 will tend to pull the bow B into alignment with the mounted ends of the spoke.

Or, conversely, the hooker 7 can be set with its end crotch 8 across the spoke and with the spoke in the lateral hook seats 13, in which case the screw is turned so as to thrust the hooker 7 outward with an action reverse to that indicated in Fig. 1.

The rim may be bodily shifted into proper alignment at places needed by use of the tool on the spokes at relative zones around the wheel.

Figure 3 depicts a form of buttressing arm including a screw-threaded shank part 10' adjustable as to the socket part on bar 2.

It will be noted that the parts 4—10—10' have inclined guide faces leading to the roots of the hooks 9—13. This is to greatly facilitate the application of the tool to the work.

What is claimed is:

1. A tool for straightening or bending the wire spokes of a wheel, comprising a stock bar on which is slidable a set of buttress arms and having an intermediate jack-screw having a swivel-jointed, coaxial hooker; said arms and hooker having crotched ends to seat against a wire end and having side hook seats to hook onto a wire according to the intended use of the tool; said buttress arms including adjustable shanks.

2. A tool for straightening or bending the wire spokes of a wheel, comprising a stock bar on which is slidable a set of buttress arms and having an intermediate jack-screw having a swivel-jointed, coaxial hooker; said arms and hooker having crotched ends to seat against a wire and having side hook seats to hook onto a wire according to the intended use of the tool; said arms and said hooker forming selectively applicable pulling or pushing means and said arms and hooker presenting inclined guide faces extending down to the roots of the said side hooks.

HOMER R. KENNEDY.